(12) United States Patent
Pogge et al.

(10) Patent No.: US 6,640,021 B2
(45) Date of Patent: Oct. 28, 2003

(54) FABRICATION OF A HYBRID INTEGRATED CIRCUIT DEVICE INCLUDING AN OPTOELECTRONIC CHIP

(75) Inventors: H. Bernhard Pogge, Hopewell Junction, NY (US); Roy Yu, Poughkeepsie, NY (US); Chandrika Prasad, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 101 days.

(21) Appl. No.: 10/013,095

(22) Filed: Dec. 11, 2001

(65) Prior Publication Data

US 2003/0108269 A1 Jun. 12, 2003

(51) Int. Cl.$^7$ .............................. G02B 6/12; G02B 6/10
(52) U.S. Cl. ........................ 385/14; 385/131; 385/132; 438/29; 438/31
(58) Field of Search .............................. 385/14, 88–94, 385/131, 132; 438/26–28, 31, 69, 72, 64, 65, 29

(56) References Cited

U.S. PATENT DOCUMENTS

| | | | |
|---|---|---|---|
| 4,969,712 A | 11/1990 | Westwood et al. | 385/14 |
| 5,195,154 A | 3/1993 | Uchida | 385/88 |
| 5,249,245 A | 9/1993 | Lebby et al. | 385/89 |
| 5,319,725 A | 6/1994 | Buchmann et al. | 385/14 |
| 5,600,741 A | 2/1997 | Hauer et al. | 385/35 |
| 5,611,008 A | 3/1997 | Yap | 385/14 |
| 5,625,734 A | 4/1997 | Thomas et al. | 385/88 |
| 5,629,534 A | 5/1997 | Inuzuka et al. | 257/84 |
| 5,715,338 A | 2/1998 | Sjolinder et al. | 385/14 |
| 5,773,897 A | 6/1998 | Wen et al. | 257/778 |
| 5,972,232 A | 10/1999 | Lee et al. | 216/24 |
| 6,009,218 A | 12/1999 | Grand et al. | 385/14 |
| 6,088,492 A | 7/2000 | Kaneko et al. | 385/14 |
| 6,164,836 A | 12/2000 | Yamada et al. | 385/88 |
| 6,215,585 B1 | 4/2001 | Yoshimura et al. | 359/344 |
| 6,222,951 B1 | 4/2001 | Huang | 385/14 |
| 6,236,774 B1 | 5/2001 | Lackritz et al. | 385/14 |
| 6,243,509 B1 | 6/2001 | Chen | 385/14 |
| 6,438,281 B1 * | 8/2002 | Tsukamoto et al. | 385/14 |
| 6,444,560 B1 * | 9/2002 | Pogge et al. | 438/612 |
| 2002/0061154 A1 * | 5/2002 | Tsukamoto et al. | 385/14 |

OTHER PUBLICATIONS

U.S. Appl. No. 09/669,531, filed Sep. 26, 2000 entitled "Process for making fine pitch connections between devices and structure made by the process". Pogge et al.

* cited by examiner

Primary Examiner—Brian Healy
Assistant Examiner—Kevin S Wood
(74) Attorney, Agent, or Firm—Jay H. Anderson (57) ABSTRACT

A process is described for integrating an optoelectronic chip and a driver chip on a substrate, in which a waveguide is built into the substrate and the chips are joined to the substrate using a stud/via alignment technique. The waveguide structure includes a reflector and a channel for transmitting light emitted by the optoelectronic chip. A stud formed on the substrate is aligned to a via formed in a layer on the chip, aligning the chip so that the light reaches the reflector and enters the waveguide. A driver chip may be mounted on the substrate in close proximity to the optoelectronic chip.

20 Claims, 12 Drawing Sheets

FABRICATION OF A HYBRID INTEGRATED CIRCUIT DEVICE INCLUDING AN OPTOELECTRONIC CHIP

FIELD OF THE INVENTION

This invention relates to the manufacture of integrated circuit devices. More particularly, this application relates to a process for integrating optoelectronic chips with chips fabricated using other technologies.

BACKGROUND OF THE INVENTION

The need for greater functionality and performance in semiconductor devices has resulted in the development of larger and more complex chips. In addition, it is often desirable to include several different functions on a single chip to obtain a "system on a chip," which generally results in both an increased chip size and a more complicated manufacturing process. These factors both tend to depress manufacturing yield. It is estimated that many such complex chips, with areas greater than 400 mm$^2$, will generally have very poor manufacturing yield (perhaps under 10%).

One method of maintaining acceptable yields is to manufacture smaller chips, and then to interconnect those chips on a single substrate or chip carrier. Besides improved manufacturing yield, another major advantage of this approach is that the individual chips may be of different sizes, perform different functions, or be fabricated by different or incompatible methods. A system constructed according to this approach is illustrated schematically in FIG. 1. The substrate 1 has several chips 11 mounted thereon which have different sizes and functions. Chips 11 are interconnected either through conductors embedded in substrate 1, or through a layer overlying the chips (not shown) containing wiring, so that a system on a chip is formed.

Figure 1:
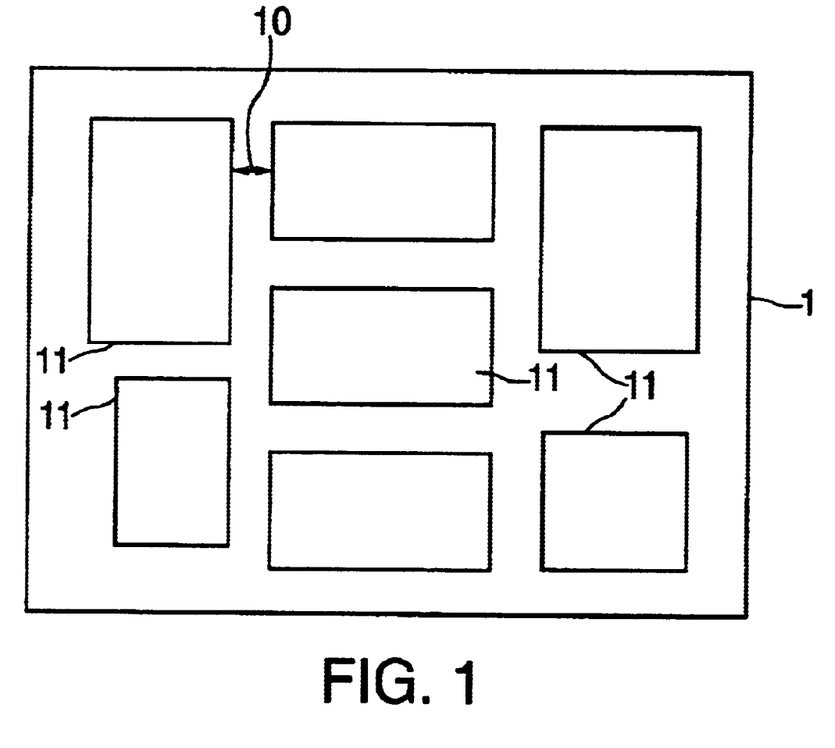
FIG. 1 is a schematic illustration of system on a chip in which chips of various sizes are integrated and connected in close proximity.

To effectively realize the advantages offered by the system-on-a-chip (SOC) concept, it is desirable for all of the different chip functions to be in very close proximity and have very precise alignment with respect to each other. For example, spacing 10 between chips 11 is preferably about 50 µm or less. The alignment and interconnection should also be performed with minimal added complexity in the overall process. In the case of an SOC, the interconnections should be made on top of the chips rather than in the chip carrier substrate.

Integrating optoelectronic chips with chips of other types poses a difficult challenge because very accurate chip placement is required. An optoelectronic chip having electrical input and light output must be placed so that it is both connected to the other chips in the system and at the same time coupled to a light-transmitting waveguide. For example, a light-emitting chip requiring a driver chip must be connected to the driver to receive signals therefrom. It is also desirable that the substrate have a built-in waveguide so that the light is efficiently transmitted.

There remains a need for a process for fabricating a device having a dense arrangement of chips and a high wiring density of chip-to-chip interconnections, which includes an optoelectronic chip and which can be practiced with high manufacturing yield.

SUMMARY OF THE INVENTION

The present invention addresses the above-described need by providing a process for integrating an optoelectronic chip and a driver chip on a substrate, and in which a waveguide is built into the substrate and the chips are joined to the substrate using a stud/via alignment technique.

In accordance with the invention, a waveguide structure is formed in the substrate; the waveguide structure includes a reflector and a channel for transmitting the light. A first layer is then formed on the substrate and overlying the waveguide structure. A stud is formed on the substrate in an opening in this layer. A second layer is formed on the chip, and a via is formed therein. The stud is then aligned to the via, thereby aligning the chip so that the light reaches the reflector through an opening in the first layer. The chip is then attached to the substrate.

In addition, electrical wiring is provided on the substrate, with electrical contact to the stud. Studs connected to different chips are therefore in contact, so that the chips are wired to each other. In particular, a driver chip may be mounted on the substrate along with the optoelectronic chip and connected thereto.

In one embodiment of the invention, a silicon substrate is used and the waveguide structure is formed therein. An angled surface is formed by etching a portion of the substrate; this angled surface is covered by a reflective layer. The waveguide is built in the etched portion; the waveguide has a first reflective layer, a light-transmitting layer and a second reflective layer. The waveguide is parallel to the substrate surface, and light falling incident onto the substrate normal to its surface is reflected by the angled reflector into the waveguide.

According to another embodiment of the invention, the waveguide structure is formed on a plate having a reflective layer and a light-transmitting layer (such as polyimide) deposited thereon. An opening is formed in the light-transmitting layer; the opening has an angled wall at an acute angle with respect to the surface of the plate, and a waveguide entry wall normal to the plate surface and opposite the angled wall. A second reflective layer is formed on a portion of the light-transmitting layer overlying the first reflective layer; the reflector is formed on the angled wall of the opening. The angled wall may be at an angle of 45° with respect to the surface of the plate, so that light normally incident on the plate enters the waveguide at normal incidence thereto.

According to a third embodiment of the invention, the waveguide structure is formed from a plate of light-transmitting material. A feature is formed in the plate which has a top surface and side surfaces; these will become the top and sides of the waveguide channel. A layer of cladding material is formed on these top and side surfaces. An adhesive layer is formed on the cladding layer, and a handling plate is attached to the adhesive layer. The bottom of the plate of light-transmitting material is then polished, to define the light transmitting channel. A second layer of cladding material is formed on the bottom surface of the channel, so that the channel and the layers of cladding material form a waveguide. A supporting plate is attached to the second layer of cladding material. The interface between the handling plate and the adhesive layer is then ablated using radiation transmitted through the handling plate, thereby detaching the handling plate.

The stud/via chip joining process permits placement of chips on the substrate with very high accuracy, and can accommodate chips of different sizes and technologies. By providing a process for building a light waveguide into the substrate, the present invention permits fabrication of a hybrid circuit having a driver chip and a light emitting chip.

BRIEF DESCRIPTION OF THE DRAWINGS

FIG. 4C-1 is a detail plan view of FIG. 4C, showing a shaped polyimide waveguide entry surface which acts as a lens for VCSEL laser radiation incident thereon.

DETAILED DESCRIPTION OF THE PREFERRED EMBODIMENTS

In accordance with the present invention, a semiconductor device integrated with an optoelectronic chip is fabricated using stud/via connections and contains a light waveguide parallel to the substrate surface. In the embodiments discussed below, the optoelectronic chip is a vertical cavity surface-emitting laser (VCSEL) chip and is coupled to a silicon-germanium (SiGe) driver chip. It will be appreciated that these types of chips are discussed for purposes of illustration only, and that the present invention may be practiced with a wide variety of chips.

A SiGe driver chip and VCSEL chip are mounted on the substrate in close proximity and with very high accuracy using a stud/via process. In the examples described herein, studs are formed on the substrate surface and vias are formed in a layer on each of the chips. However, the position of studs and vias may be reversed, with studs formed on the chips and vias formed in a layer overlying the substrate.

Figure 2A:
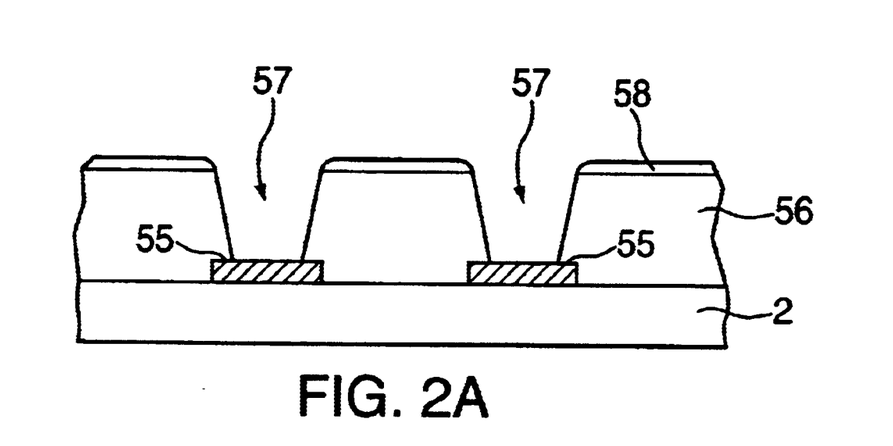
FIG. 2A illustrates a driver chip with via connectors formed thereon, in accordance with an embodiment of the invention.

As shown in FIG. 2A, driver chip 2 has disposed thereon terminal metal conducting pads 55 and a dielectric (e.g. polyimide) layer 56. Layer 56 has vias 57 formed therein (e.g. by reactive-ion etching or by an excimer laser), so that a conducting pad 55 is at each via bottom. The thickness of layer 56 (and hence the depth of the vias 57) is chosen to match the height of the studs (described in more detail below). The VCSEL chip 3 similarly has at least one conducting pad 55 and a dielectric layer 56 with a via 57 formed therein. In addition, the VCSEL chip has a light-emitting surface 53 (shown schematically in FIG. 2B) at the bottom of via opening 52.

Figure 2B:
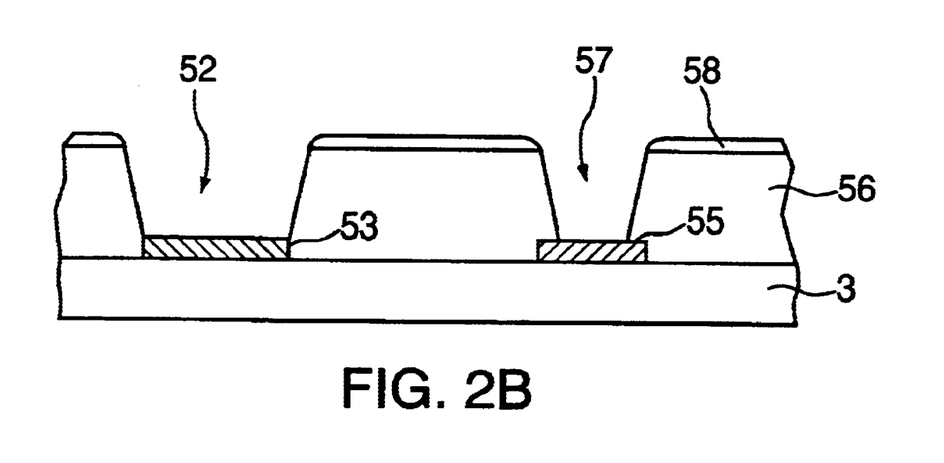
FIG. 2B illustrates an optoelectronic chip with a via connector and an optical output via formed thereon, in accordance with an embodiment of the invention.

As shown in FIGS. 2A and 2B, the vias may be formed with a sloped wall angle as a guide for high-accuracy, self-aligned placement of studs in the vias 57. The wall angle of the via may be tailored to be either near-vertical or sloped. A near-vertical vertical profile can be obtained if the vias are formed by RIE. It has been noticed that stud/via alignment is readily accomplished when the wall angle is 65°; a via with this wall angle may conveniently be obtained when an excimer laser is used to form the via.

A thin coating 58 of thermoplastic polymer adhesive may be deposited on the top of the dielectric layer 56, to ensure reliable bonding to the substrate. Alternatively, the entire layer 56 may be formed of adhesive material. An adhesive layer may be deposited on the substrate in addition to, or instead of, layer 58.

A light waveguide may be built into the substrate according to a number of methods, as detailed below.

First Waveguide Embodiment: Reflector Formed in Si

In this embodiment of the invention, a silicon wafer is prepared with an integral reflector for directing light emitted by the VCSEL, and a waveguide beneath the original surface of the substrate.

Figure 3A:
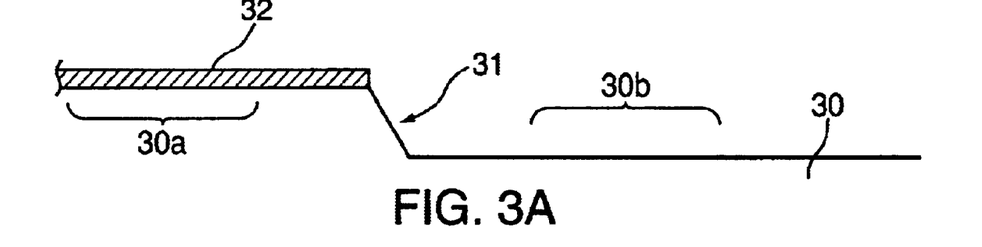
FIGS. 3A–3F illustrate steps in a process for integrating a driver chip and an optoelectronic chip on a silicon wafer, in accordance with an embodiment of the invention.

As shown in FIG. 3A, Si wafer 30 is etched to form an angled feature 31. This may be done by masking region 30a of wafer 30 with a layer 32 (e.g. photoresist) and then etching the Si in a KOH solution, which results in the (111) crystal plane being exposed on a (100) oriented Si wafer. Accordingly, region 31 of the wafer is oriented at an angle of 54.7° with respect to the etched region 30b.

Figure 3B:
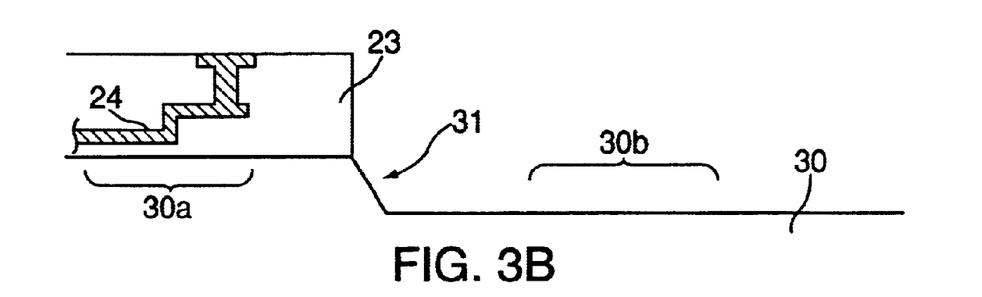

A dielectric material is deposited on the wafer and patterned to form layer 23 on the unetched region 30a. The dielectric may be $SiO_2$, polyimide, or some other convenient material. Electrical wiring 24 (shown schematically in FIG. 3B and subsequent figures) is formed in layer 23. The wiring is used to connect chips to each other on top of the substrate; in particular, wiring 24 shown in FIG. 3B is for connecting VCSEL chip 3 to driver chip 2, as discussed in more detail below. The electrical wiring is shown here as already complete at the beginning of the waveguide fabrication process, but may instead be formed at another convenient time, using methods known in the art. The dielectric layer 23 and wiring 24 may also be formed prior to the Si etch. In this case masking layer 32 is applied on top of layer 23.

Figure 3C:
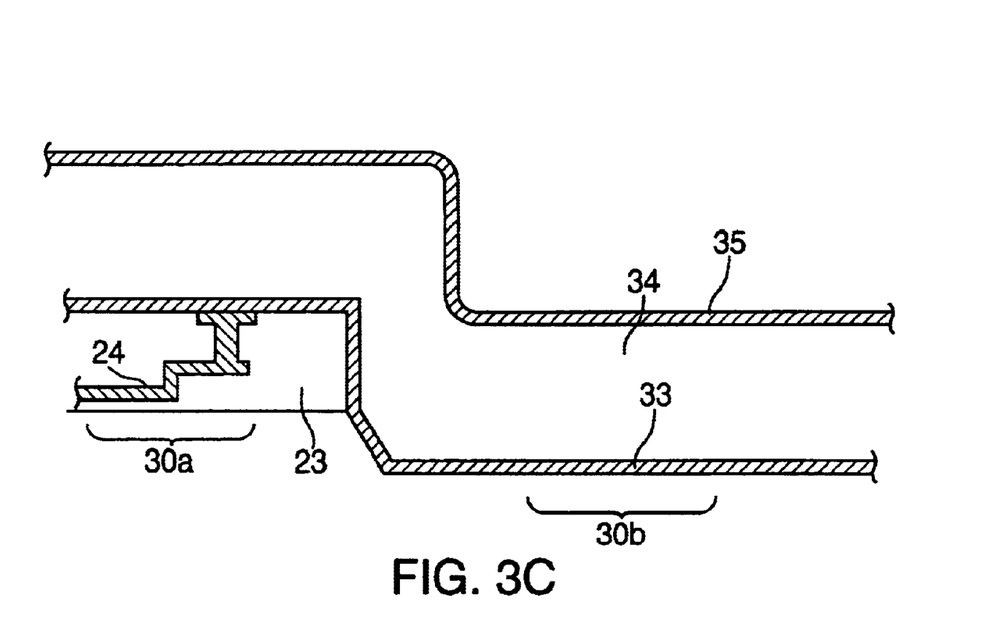

After the etch to form angled region 31, waveguide layers 33, 34, 35 are successively deposited on the substrate, as shown in FIG. 3C. In general, the waveguide interior 34 is of a light-transmitting material, while waveguide cladding layers 33, 35 are of a material that reflects the light emitted by the VCSEL chip 3. For example, the transmitting layer 34 may be of polyimide, while the cladding layers 33, 35 may be of metal. However, a wide variety of materials may be used, provided that their relative refractive indices permit efficient transmission of the light along the waveguide. Since in this embodiment the angle of incidence of the VCSEL light is slightly greater than 45°, numerous shallow-incidence reflections will occur at the cladding layers 33, 35.

Figure 3D:
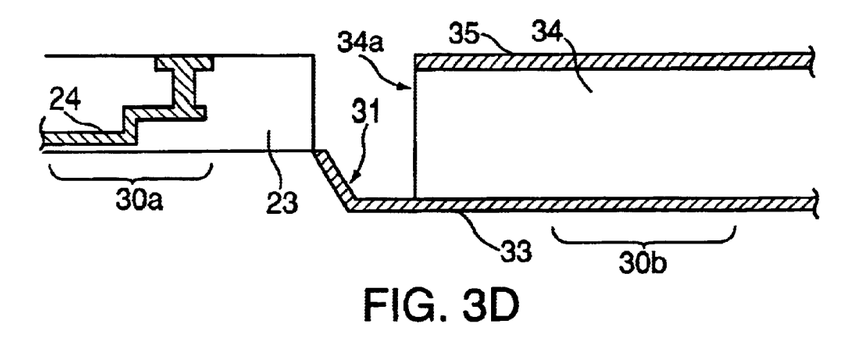

The substrate is then patterned and etched to remove layers 35 and 34 from layer 23 overlying region 30a, and from the angled region 31 of the substrate, so that a vertical surface 34a is formed at the entrance to the waveguide structure. The substrate is patterned and etched again, so that layer 33 is removed from region 30a but forms an angled reflector at 31. FIG. 3D shows the completed waveguide formed in the substrate.

Figure 3E:
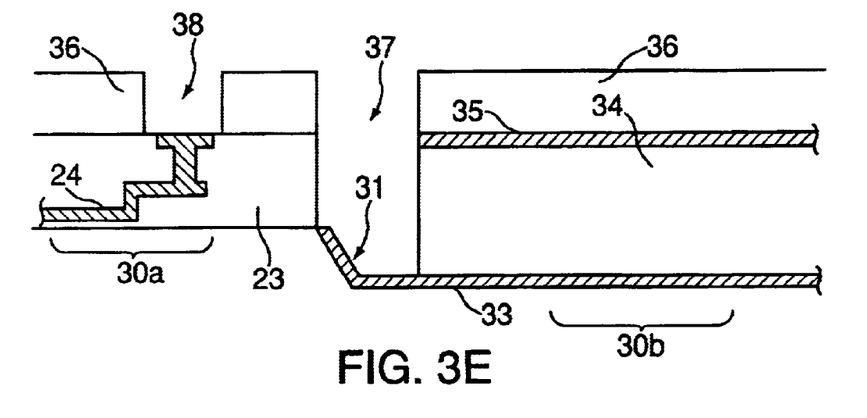

A layer of polyimide 36 is then deposited on the substrate, covering both the wiring layer in region 30a and the waveguide in region 30b (FIG. 3E). The polyimide layer 36 has openings 37, 38 formed therein for making subsequent optical and electrical connections respectively. In particular, opening 38 exposes an area of the surface of layer 23 including wiring 24.

Figure 3F:
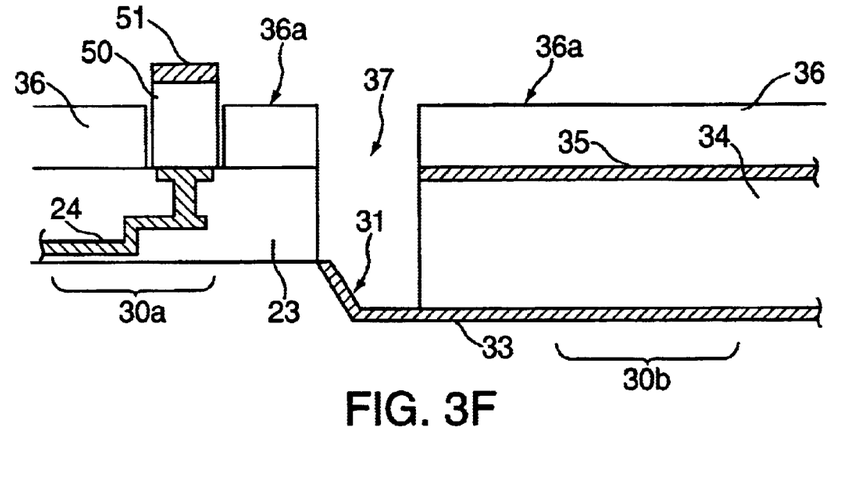

A stud 50 is formed on the surface of layer 23 in opening 38, making electrical contact with wiring 24 (see FIG. 3F).

The stud may be formed of Ni, Cu, Ni-plated Cu, W or some other metal or combination of metals. The stud 50 protrudes from surface 36a of the polyimide layer a distance which typically is 5 μm or less. A layer 51 of a low-melting-point alloy material is deposited on the surface of the stud; this facilitates formation of an electrical connection during the joining process. This material is typically 90/10 Pb/Sn solder, 2 μm or less thick; alternative alloy materials include Au/Sn and Sn/Ag. FIG. 3F shows the substrate with a completed waveguide structure and ready for bonding to the chips by a stud/via joining process.

Second Waveguide Embodiment: Patterned Polyimide Layer

In this embodiment, polyimide is used as a waveguide material, and the waveguide is formed on a convenient supporting plate such as a glass plate.

Figure 4A:
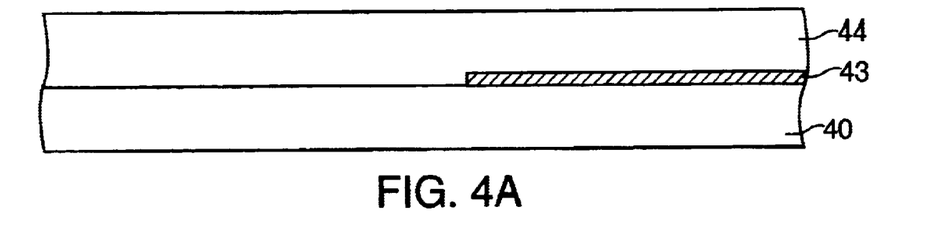
FIGS. 4A–4G illustrate steps in a process for integrating a driver chip and an optoelectronic chip on a substrate using a layer of polyimide, in accordance with another embodiment of the invention.
Figure 4B:
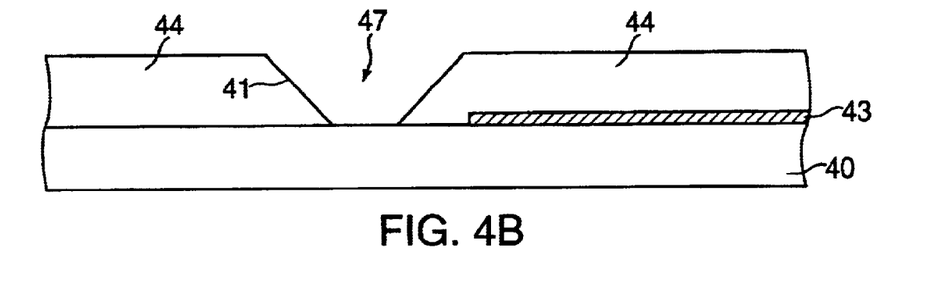
Figure 4C:
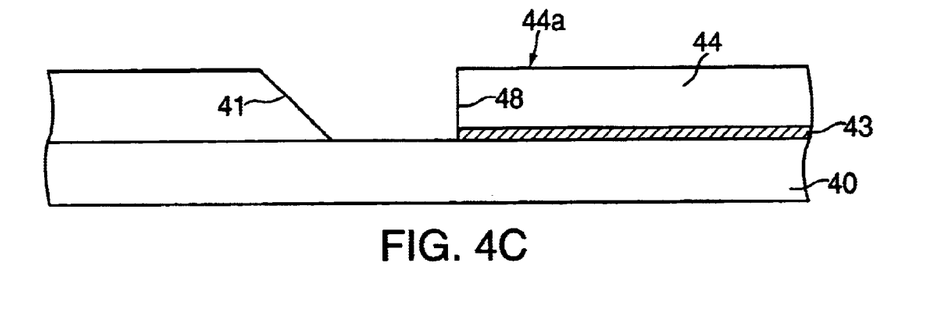
Figure 4C:
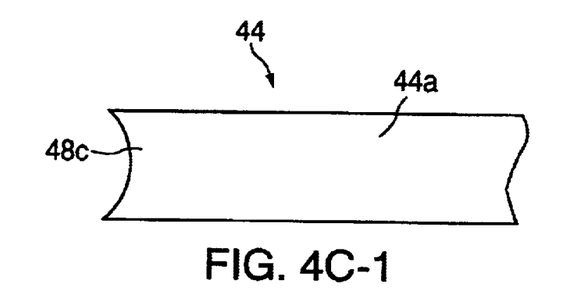

A thin layer 43 of waveguide cladding material is formed on plate 40 where the waveguide structure is desired (FIG. 4A). Layer 43 is of a material which reflects the light emitted by the VCSEL. In this embodiment, layer 43 may conveniently be a metal such as Cr. A polyimide layer 44 is then deposited on the plate. A laser is used to form an opening 47 in layer 44; the laser energy density is adjusted so that surface 41 of the polyimide is at a 45° angle with respect to the surface of the plate (FIG. 4B). This energy density is typically in the range 200–500 mJ/cm². The angled surface is then masked, and the polyimide is again treated with a laser, to form a vertical surface 48 (FIG. 4C). The energy density used in this process is typically in the range 1000–1500 mJ/cm². Surface 48 serves as the entry surface of the waveguide; that is, light reflected from 45° surface 41 falls on surface 48 at normal incidence. Alternatively, surface 48 may be shaped as a lens to focus or defocus the laser beam as desired; an example of a lens-shaped waveguide entry surface is shown in FIG. 4C-1. FIG. 4C-1 is a detail view of FIG. 4C, showing the top surface 44a of layer 44 with a concave waveguide entry surface 48c.

Figure 4D:
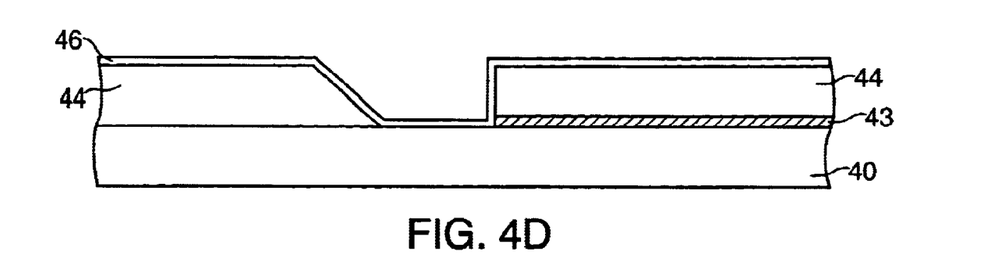
Figure 4E:
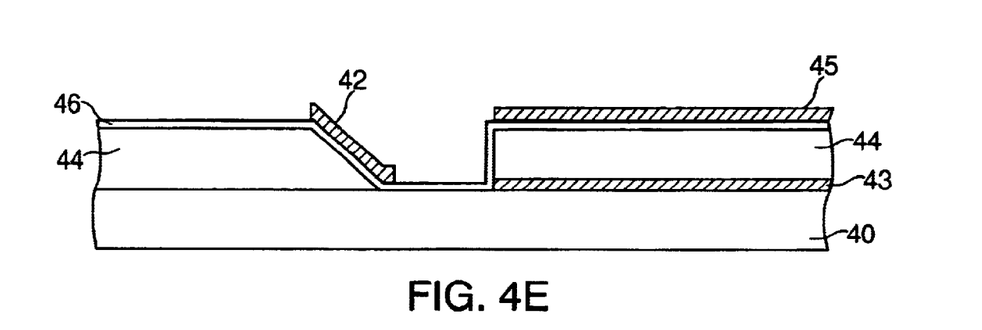
Figure 4F:
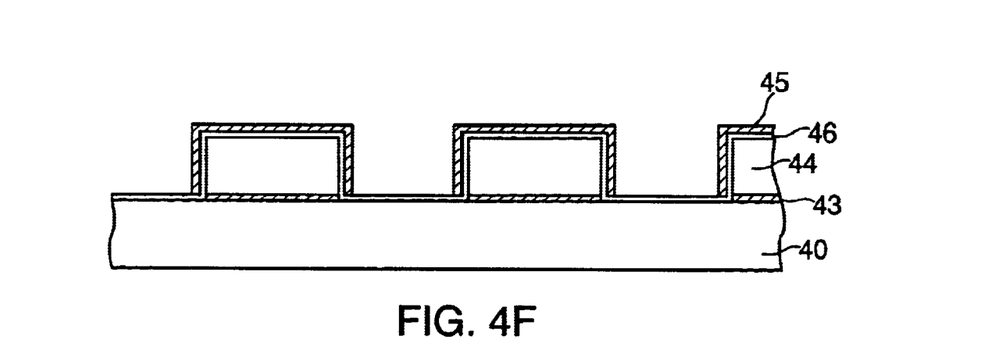

An additional polyimide layer 46 is then deposited on the shaped polyimide layer 44 (FIG. 4D); this layer is about 1000 Å thick and provides a smooth surface for depositing the metal. A layer of reflective material is then deposited on layer 46 and patterned to form upper waveguide cladding layer 45 and reflector 42 (FIG. 4E). FIGS. 4E and 4F show the completed waveguide structure in this embodiment. FIG. 4F is an end view of the structure of FIG. 4E, showing that multiple parallel waveguides may be fabricated simultaneously.

Figure 4G:
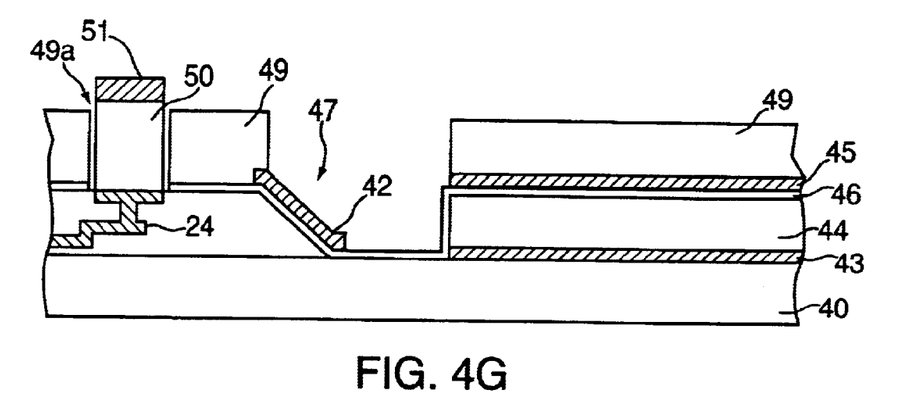

At a convenient point in the process, electrical wiring 24 is formed in the portion of layer 44 not included in the waveguide (see FIG. 4G). A polyimide layer 49 is subsequently deposited over the substrate and has openings formed therein for electrical and optical connections, as in the first embodiment; opening 49a extends through layers 49 and 46 so that wiring 24 at the surface of layer 44 is exposed. A stud 50 with solder layer 51 is built in opening 49a to make electrical contact with wiring 24. The structure of FIG. 4G is then ready for joining with the chips (compare FIG. 3F). In contrast to the first embodiment, the angled reflector for the VCSEL output is formed on polyimide layer 44 on plate 40, instead of etched silicon surface 31.

Third Waveguide Embodiment: Polished Optical Material

In this embodiment, the waveguide structure may be conveniently formed with a transparent light-transmitting material such as glass. FIGS. 5A–5F show steps in the waveguide fabrication process in an end-on view. As noted above, multiple parallel waveguides may be formed in the same process.

Figure 5A:
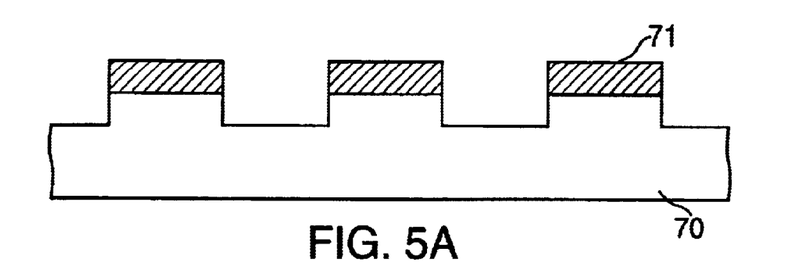
FIGS. 5A–5I illustrate steps in a process for fabricating a waveguide structure in accordance with an additional embodiment of the invention.
Figure 5B:
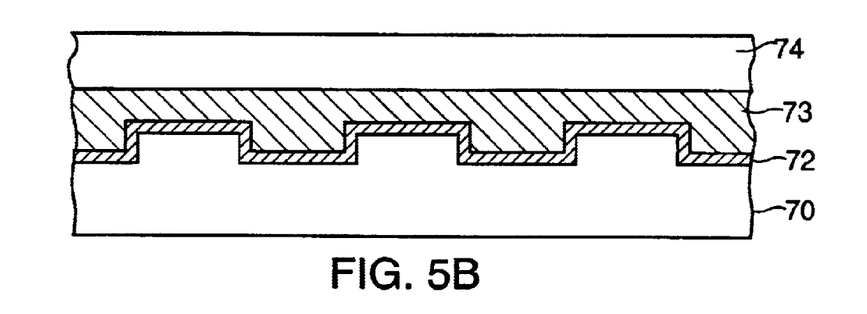

A plate of optical material 70 (e.g. a glass plate) having a suitable refractive index $n_1$ is patterned and etched using a resist layer 71 (FIG. 5A). Resist layer 71 is removed, and a waveguide cladding layer 72, having a different refractive index $n_2$, is deposited on the etched profile of plate 70 (FIG. 5B). The refractive indices $n_1$ and $n_2$ are chosen so that light is efficiently transmitted through the material of plate 70, and reflected from cladding layer 72.

Figure 5C:
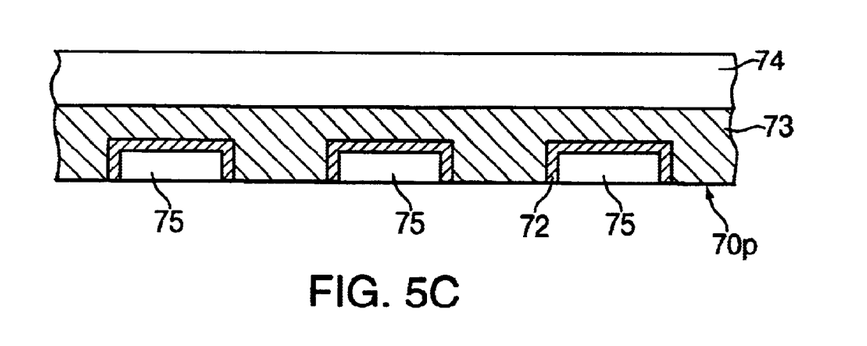
Figure 5D:
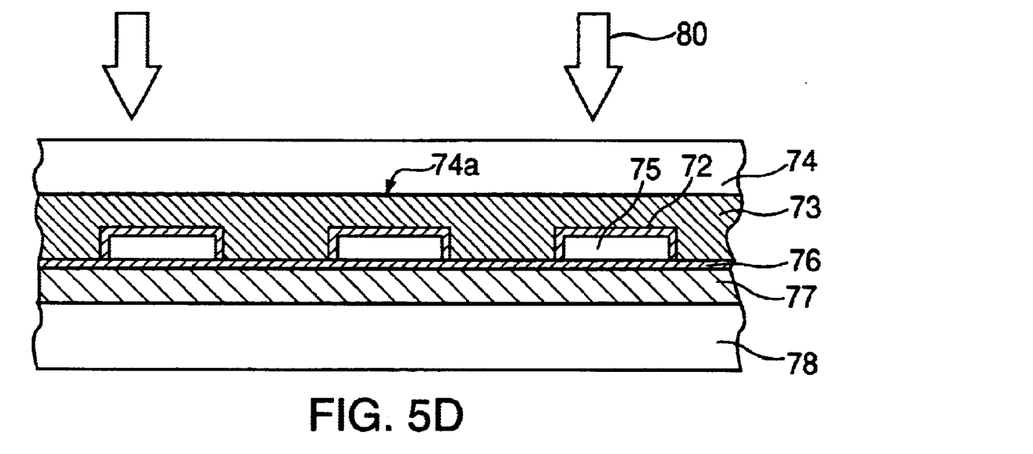
Figure 5E:
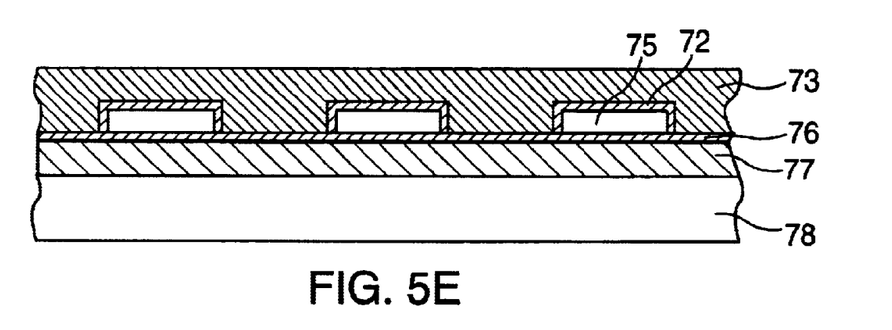
Figure 5F:
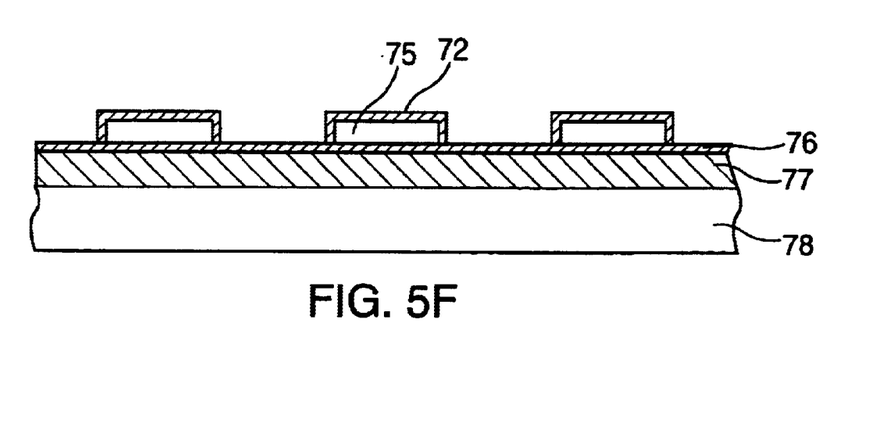

A temporary carrier 74 (such as another glass plate) is attached using an adhesive layer 73. Plate 70 is then thinned (for example, by chemical-mechanical polishing) to surface 70p, so that the remaining portions of plate 70 are separate light-transmitting channels 75 (FIG. 5C). Surface 70p is then coated with an additional cladding layer 76; layer 76 has index of refraction $n_2$, so that each channel 75 is encased by the cladding material. Layer 76 is then coated with an adhesive layer 77, and a supporting plate 78 is attached thereto (FIG. 5D). After the supporting plate 78 is attached, the interface 74a between the temporary carrier 74 and adhesive layer 73 is ablated using laser radiation 80. Temporary carrier 74 is thereby detached from the waveguide structure, yielding the structure shown in FIG. 5E. Adhesive layer 73 is then removed, yielding the finished waveguide structures, as shown in FIG. 5F.

Figure 5G:
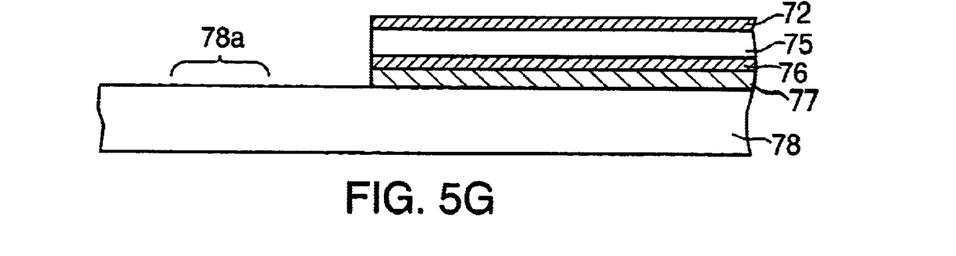
Figure 5H:
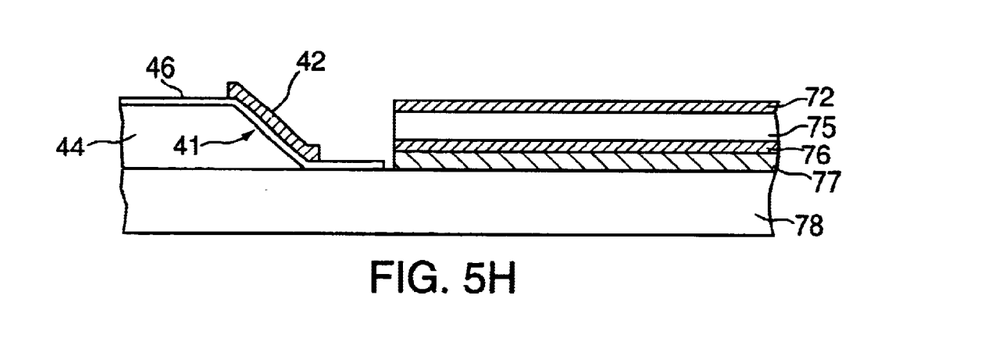
Figure 5I:
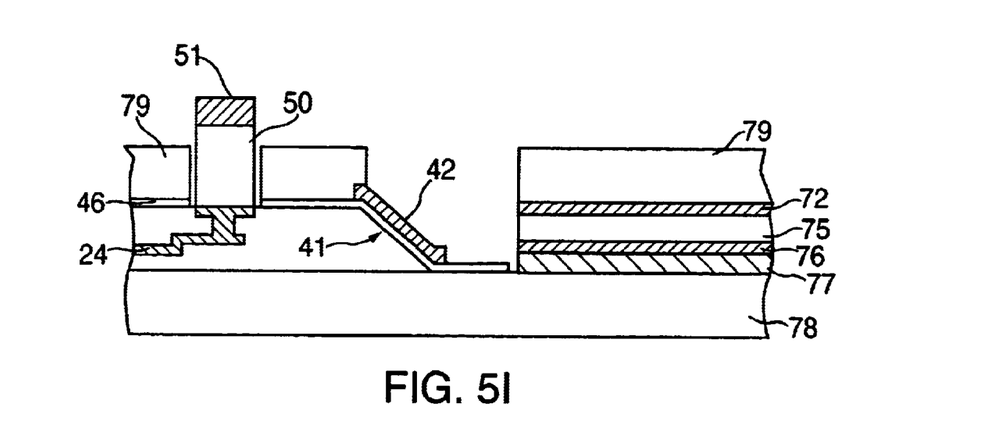

The waveguide structures of this embodiment may be joined to another substrate having a polyimide layer with an angled reflector (as prepared according to the second embodiment). Alternatively, supporting plate 78 may be patterned and the waveguide structures etched so as to expose a portion 78a of the supporting plate (FIG. 5G). FIG. 5G may be understood as a longitudinal cross section of one of the structures of FIG. 5F, after this etch is performed. The waveguide structure may then be masked while a polyimide layer 44 is deposited on portion 78a of the supporting plate and processed in accordance with the second embodiment, resulting in formation of a 45° reflector 42 (FIG. 5H). At this point in the process, electrical wiring 24 is formed in polyimide layer 44 if it was not formed previously. A polyimide layer 79 is then deposited on the substrate and has openings formed therein, with studs built in the openings where wiring 24 is exposed (FIG. 5I). The structure of FIG. 5I is then ready for joining with the chips (compare FIGS. 3F and 4G).

Stud-via Chip Join to Substrate

The process of joining the driver chip 2 and optoelectronic chip 3 to the substrate is illustrated using the structure of the first waveguide embodiment described above (see FIG. 6A). In this embodiment, the etched Si wafer 30, layer 23 containing wiring 24, and the waveguide structure including layers 33–35 form the substrate; layer 36 overlies the substrate and has openings formed therein for making electrical and optical connections.

Figure 6A:
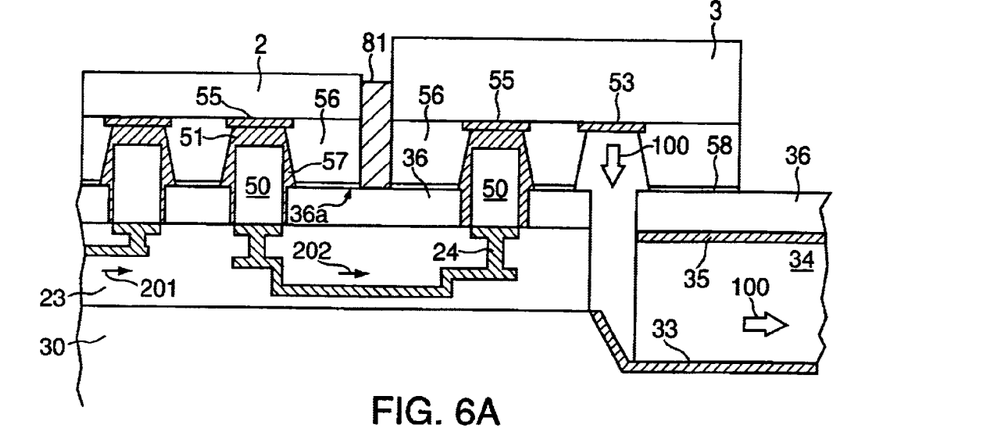
FIG. 6A is a schematic illustration of an integrated driver chip and optoelectronic chip including a waveguide structure and stud/via connections, in accordance with the invention.

As shown in FIG. 6A, the driver chip 2 and VCSEL chip 3 are aligned to the substrate by placing studs 50 in corresponding vias 57. As is understood by those skilled in the art, an automated alignment tool may be used to align the chips to the alignment structure; if such a tool is used, the matching of the stud pattern to the via pattern can be made with a pitch of as little as 2 μm.

Each chip may be temporarily held in position relative to the substrate, while alignment and placement of other chips is performed. This may be done by performing the alignment procedure at an elevated temperature, so that the surface of adhesive layer 58 (or if no adhesive layer is used, polyimide layer 56) becomes slightly "tacky" before being brought into contact with the surface of the polyimide layer overlying the substrate (e.g. surface 36a).

After all of the chips have been aligned and temporarily held or "tacked" to the substrate, a lamination process is performed to permanently attach the chips 2 and 3 to layer 36. The lamination process is typically performed at elevated temperature and pressure, to ensure (1) stud/via registration; (2) vertical metal bonding between the studs 50 and via joining pads 55; and (3) bonding of the chips 2, 3 to the substrate (and to any material therebetween—in this case polyimide layer 36). Depending on the materials used, the temperature may be in the range 200° C.–400° C. and the pressure may be in the range 10 psi–200 psi. As shown in FIG. 6A, the lamination process causes the solder 51 to flow so that solder either partially or completely fills via 57.

After the lamination process, the gap between chips 2 and 3 may optionally be filled (either fully or partially) with a suitable material 81, such as thermoset epoxy or another organic material. To build a dense array of chips (so as to arrive at an optimum performance integrated system-on-a-chip structure), it is desirable that the gaps between adjacent chips be as narrow as possible, generally about 50 μm or less.

As shown in FIG. 6A, the driver chip 2 and VCSEL chip 3 are electrically coupled through the wiring 24, studs 50, solder 51 and pads 55. The optical signal 100 emitted from the VCSEL chip 3 is reflected into the waveguide material 34 and down the waveguide towards a light receiver (not shown).

Figure 6B:
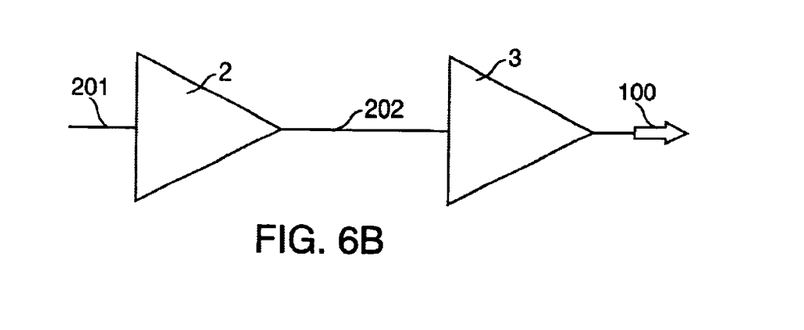
FIG. 6B is a circuit diagram of the structure shown in FIG. 6A.

FIG. 6B shows a circuit diagram of a circuit realized by the structure of FIG. 6A. Driver chip 2 receives an input signal 201 and delivers an output signal 202 to VCSEL chip 3, which emits light signal 100.

Figure 7:
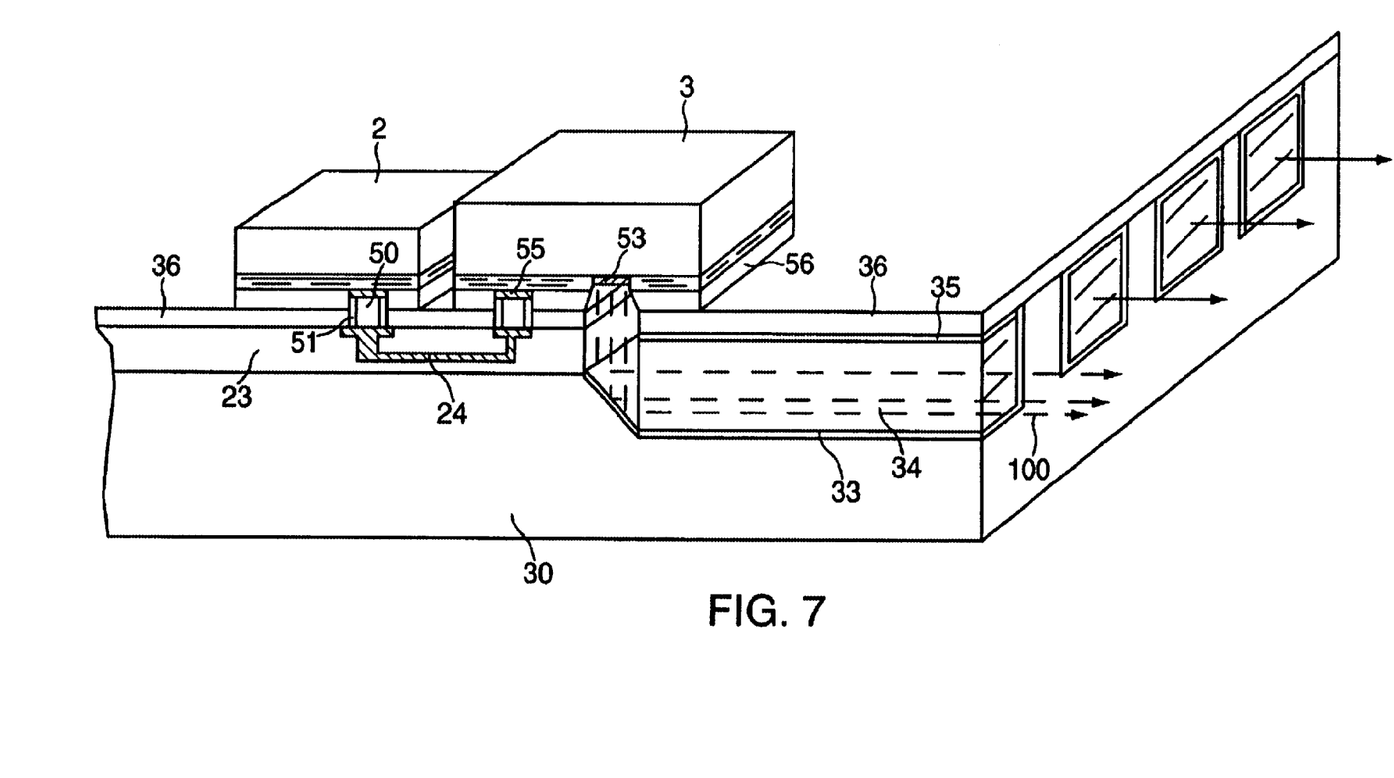
FIG. 7 is a cross-sectional view of a substrate with a driver chip and an optoelectronic chip integrated thereon, showing an array of light waveguides built into the substrate.

FIG. 7 is a schematic illustration of the driver chip 2 and VCSEL chip 3 mounted on the substrate of FIG. 6A, showing both longitudinal and end-on cross-sectional views. As shown in FIG. 7, an array of waveguide structures may be formed in the substrate; the single or multiple light outputs 100 of the VCSEL chip may be reflected into one or more waveguides. Alternatively, an array of VCSEL chips may be mounted on the substrate, with each VCSEL chip connected to one or more drivers and coupled to one or more waveguides.

While the invention has been described in terms of specific embodiments, it is evident in view of the foregoing description that numerous alternatives, modifications and variations will be apparent to those skilled in the art. Accordingly, the invention is intended to encompass all such alternatives, modifications and variations which fall within the scope and spirit of the invention and the following claims.

We claim:

1. A method for fabricating a semiconductor device including a light-emitting chip mounted on a substrate, the method comprising the steps of:

forming a waveguide structure in the substrate, the waveguide structure including a reflector for reflecting light emitted by the light-emitting chip and a light-transmitting channel for transmitting the light;

forming a first layer on the substrate and overlying the waveguide structure, the first layer having a first opening exposing a portion of the substrate and a second opening exposing the reflector;

forming a stud on the substrate in the first opening;

forming a second layer on the chip;

forming a via in the second layer;

aligning the stud to the via, thereby aligning the chip so that the light is transmitted through the second opening to the reflector; and attaching the chip to the substrate.

2. A method according to claim 1, further comprising the steps of:

providing a driver chip for driving the light-emitting chip;

forming a stud on the substrate and a third layer on the driver chip;

forming a via in the third layer;

aligning the stud to the via, thereby aligning the driver chip with respect to the light-emitting chip; and attaching the driver chip to the substrate.

3. A method according to claim 1, further comprising the steps of:

providing a conducting pad on the light-emitting chip which is exposed in said step of forming the via, so that the stud contacts the conducting pad in said step of attaching the chip to the substrate; and providing electrical wiring in the substrate in contact with the stud, so that the chip is connected to the electrical wiring through the stud and the conducting pad in said step of attaching the chip to the substrate.

4. A method according to claim 2, further comprising the steps of:

providing a first conducting pad on the light-emitting chip which is exposed in said step of forming the via in the second layer, so that a first stud contacts the first conducting pad in said step of attaching the chip to the substrate;

providing a second conducting pad on the driver chip which is exposed in said step of forming the via in the third layer, so that a second stud contacts the second conducting pad in said step of attaching the driver chip to the substrate; and providing electrical wiring in the substrate for connecting the first stud and the second stud, so that the light-emitting chip is electrically connected to the driver chip when the light-emitting chip and the driver chip are attached to the substrate.

5. A method according to claim 1, wherein the substrate has a first surface and said step of forming a waveguide structure includes the steps of:

removing a portion of the substrate to expose a lower waveguide surface parallel to the first surface and an angled surface disposed at an angle with respect to the lower waveguide surface;

forming a first reflective layer on the lower waveguide surface;

forming a light-transmitting layer on the first reflective layer;

forming a second reflective layer on the light-transmitting layer; and forming the reflector on the angled surface, wherein
   the first reflective layer, the light-transmitting layer and the second reflective layer form a waveguide parallel to the first surface, and
   light incident on the substrate normal to the first surface is reflected by the reflector into said waveguide.

6. A method according to claim 5, wherein the substrate is a silicon wafer, and said step of removing a portion of the substrate comprises etching the silicon wafer so that the angled surface is a crystal plane of the silicon wafer.

7. A method according to claim 5, wherein said step of forming the light-transmitting layer includes patterning the light-transmitting layer to form a surface thereof characterized as a waveguide entry surface, said surface being proximate to the angled surface.

8. A method according to claim 1, wherein the waveguide structure is formed on a supporting plate having a surface and said step of forming the waveguide structure includes the steps of:

forming a first reflective layer on a first portion of said surface;

forming a light-transmitting layer on the first reflective layer and on a second portion of said surface not covered by the first reflective layer;

forming an opening in the light-transmitting layer overlying the second portion of said surface, the opening having an angled wall at an acute angle with respect to said surface and a waveguide entry wall opposite the angled wall;

forming a second reflective layer on a portion of the light-transmitting layer overlying the first reflective layer; and forming the reflector on the angled wall, wherein
the first reflective layer, the portion of the light-transmitting layer overlying the first reflective layer, and the second reflective layer form a waveguide,
light normally incident on the opening is reflected by the reflector onto the waveguide entry wall and into said waveguide, and
the substrate comprises the supporting plate, the waveguide, and the portion of the light-transmitting layer not included in the waveguide.

9. A method according to claim 8, wherein the light-transmitting layer is polyimide.

10. A method according to claim 8, wherein the first reflective layer is a metal.

11. A method according to claim 8, wherein said step of forming the opening in the light-transmitting layer includes
forming the opening using a laser at a first energy density, so that the opening has walls at an acute angle with respect to the supporting plate; and
removing an angled wall using a laser at a second energy density, thereby forming the waveguide entry surface.

12. A method according to claim 8, further comprising the step of depositing a polyimide layer on the light-transmitting layer, prior to said step of forming the second reflective layer.

13. A method according to claim 8, wherein the opening is formed with the angled wall at an angle approximately 45° with respect to the surface of the supporting plate, so that light normally incident on the substrate is reflected onto the waveguide entry wall at approximately normal incidence.

14. A method according to claim 8, further comprising the step of providing electrical wiring in the portion of the light-transmitting layer not included in the waveguide, wherein the electrical wiring is in contact with the stud.

15. A method according to claim 1, wherein said step of forming the waveguide structure includes the steps of
providing a plate of light-transmitting material having a top surface and a bottom surface;
forming a feature in the plate by removing material from a portion of the top surface, the feature having a top surface and side surfaces;
forming a first layer of cladding material on the top surface and side surfaces of the feature;
forming an adhesive layer on the first layer of cladding material attaching a handling plate to the adhesive layer;
thinning the plate of light-transmitting material to define the light-transmitting channel;
forming a second layer of cladding material on a bottom surface of the channel, the light-transmitting channel and the layers of cladding material forming a waveguide;
attaching a supporting plate to the second layer of cladding material; and
ablating an interface between the handling plate and the adhesive layer using ablating radiation transmitted through the handling plate, thereby detaching the handling plate.

16. A semiconductor device including a light-emitting chip mounted on a substrate, the device comprising:
a waveguide structure formed in the substrate, the waveguide structure including a reflector for reflecting light emitted by the light-emitting chip and a light-transmitting channel for transmitting the light;
a first layer on the substrate and overlying the waveguide structure, the first layer having a first opening exposing a portion of the substrate and a second opening exposing the reflector;
a stud on the substrate in the first opening; and
a second layer on the chip, the second layer having a via formed therein, wherein
the chip is attached to the substrate so that the stud is aligned to the via and a light-emitting portion of the chip is aligned to the second opening.

17. A semiconductor device according to claim 16, wherein the substrate has a first surface, the reflector is angled with respect to the first surface, and the waveguide structure further comprises:
a first reflective layer on a lower waveguide surface parallel to the first surface;
a light-transmitting layer on the first reflective layer; and
a second reflective layer on the light-transmitting layer.

18. A semiconductor device according to claim 16, further comprising:
a first conducting pad on the light-emitting chip in contact with the stud;
electrical wiring in the substrate in contact with the stud, so that the chip is connected to the electrical wiring through the stud and the conducting pad;
a second stud on the substrate in another opening in the first layer, the second stud being connected to the electrical wiring; and
a driver chip for driving the light-emitting chip, the driver chip having a second conducting pad thereon, the driver chip further having a third layer thereon with a via formed therein aligned to the second conducting pad, the driver chip being attached to the substrate so that the second stud is aligned to said via, the second stud making electrical contact with the second conducting pad.

19. A semiconductor device according to claim 16, wherein the substrate includes a silicon wafer, the reflector is disposed on an angled surface of the silicon wafer, and the angled surface is a crystal plane of the silicon wafer.

20. A semiconductor device according to claim 16, wherein the device comprises a plurality of light-transmitting channels, and the light-emitting chip emits light into each of said plurality of channels.

* * * * *